Figure 1:
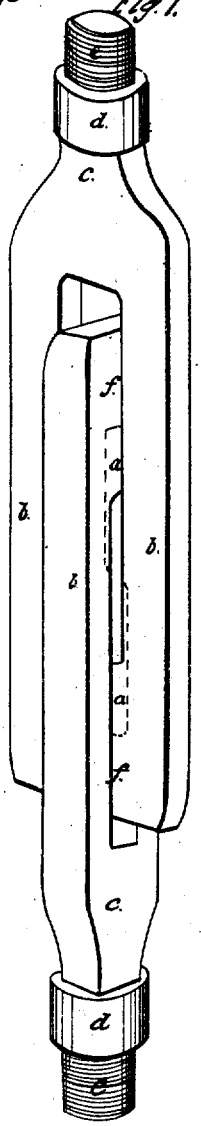

E. Guillod.

Drill Jars.

No. 3,510 Reissued Jun. 22, 1869.

Witnesses.

A. B. Moreland.

Benj. Hallway

Inventor.

Edmund Guillod

UNITED STATES PATENT OFFICE.

JOHN C. BRYAN, OF TITUSVILLE, PENNSYLVANIA, ASSIGNEE, BY MESNE ASSIGNMENTS, OF EDWARD GUILLOD.

IMPROVEMENT IN THE CONSTRUCTION OF DRILLING-JARS.

Specification forming part of Letters Patent No. 78,958, dated June 16, 1868; Reissue No. 3,510, dated June 22, 1869.

*To all whom it may concern:*

Be it known that EDWARD GUILLOD, of the city of Titusville, in the county of Crawford and State of Pennsylvania, has invented a new and useful Improvement in the Construction of Drilling-Jars for Oil-Wells; and I, JOHN C. BRYAN, of the city of Titusville, aforesaid, assignee of the said EDWARD GUILLOD by sundry mesne assignments, do hereby declare the following to be a clear and correct description of the said invention of the said EDWARD GUILLOD, reference being had to the accompanying drawings, making a part of this specification, and to the letters of reference marked thereon, like letters indicating like parts in each.

Drilling-jars for deep Artesian or oil wells were, previous to the date of this invention, usually made of wrought-iron alone, and in rare instances entirely of steel, the shape and form being substantially similar to that shown in the drawings. When made wholly of wrought-iron the heads and inner faces of the links soon became battered and upset or worn, so that they frequently became locked together and inoperative while in the well, and could only be removed by lowering and attaching another set of tools and jars, which in turn were equally liable to the same defect. If made wholly of steel, the jars are too costly and not unfrequently break from a lack of sufficient tensile strength in the link-bars, as well as in the shank and pin. The strain and wear on such jars are very great, since they are required to lift or jerk at each stroke of the drill a set of tools weighing from five hundred to one thousand pounds at an average rate of thirty to forty blows per minute, and when, as sometimes happens, a set of tools becomes fast in the well it becomes necessary to jar them constantly for days, and sometimes for weeks, before they are loosened, and in such case the success or failure of the attempt to remove the tools depends mainly upon the strength and durability of the jars, as the breaking or cracking of a jar-link in the well frequently necessitates the abandonment of the well.

The nature of this invention consists in so combining iron and steel in the manufacture of drilling-jars as to secure the necessary tensile strength in the parts subjected to great longitudinal strain and the hardness of steel in the parts which give and receive the blow and which are subject to great frictional wear, and such end is secured by welding into the wrought-iron jar a steel head-piece to receive the blow, and by making of steel the inner faces of the link-bars where the frictional wear is the greatest.

To enable others skilled in the art to make and use this invention, I will proceed to describe the same.

Figure 3:
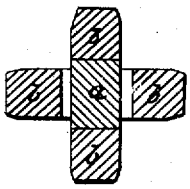
Figure 4:
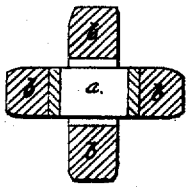
Figure 2:
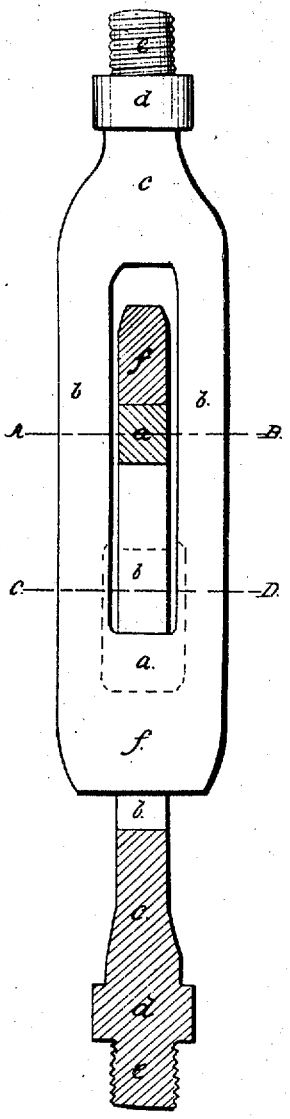

Figure 1 is a perspective view of the jars complete. Fig. 2 is a side view, partly in section, and Figs. 3 and 4 are transverse sections taken on lines *x x x' x'*.

The work of forging the jars to the required shape is done in the usual way. The threaded pin *e*, by which the jar is attached to coupling or sucker rods, the collar *d*, shank *c*, link-bars *b*, and head *f* are made of the best wrought-iron or of such other metal as will secure in those parts the requisite tensile strength; but in order to prevent the battering or upsetting of the inside of the head *f*, I make at least that part of it, *a*, which gives and receives the blow of steel, welding the steel and iron together either by welding in the block *a* in one or more pieces into the scarfed edges of the head *f* or by uniting the steel *a* to the iron part of the jar along any desired line of welding, with the use of fluxes, if necessary, in a good workmanlike manner. The pieces of steel or steel block *a*, which form the battering-head of the jars, I draw down, or otherwise shape them so that when welded to the link-bars *b* by a scarfed joint or otherwise they will give a steel face to so much of the link-bars, as at *a'*, as are subject to great frictional wear or are liable to receive any part of the blows of the heads *a f*.

The manner of welding is immaterial, as also is the shape of the steel pieces *a a'*, provided they be so shaped and so combined with the other or iron parts of the jar as to give a steel block, *a*, in each half of the jar to receive the blow, and a steel face on the inside of the links *b*, such distance down—say from twelve to twenty inches, more or less—as may be required to prevent the undue wearing or battering of the link-bars.

What I claim as the invention of the said EDWARD GUILLOD, and desire to secure by Letters Patent, is—

1. The manufacture of drilling-jars of combined iron and steel, in which at least the part *a* in each half of the jars that receives the blow and the inner faces, *a'*, of the link-bars *b* shall be of steel, substantially as and for the purposes described.

2. The hereinbefore-described drilling-jars, constructed of wrought-iron and steel combined, substantially in the manner and for the purposes set forth.

In testimony whereof the said JOHN C. BRYAN has hereunto set his hand.

JOHN C. BRYAN.

Witnesses:
E. W. STRATTON,
BEN H. MURRAY.